(12) United States Patent
Freudiger et al.

(10) Patent No.: US 10,462,107 B2
(45) Date of Patent: Oct. 29, 2019

(54) COMPUTER-IMPLEMENTED SYSTEM AND METHOD FOR ANALYZING DATA QUALITY

(71) Applicant: Palo Alto Research Center Incorporated, Palo Alto, CA (US)

(72) Inventors: Julien Freudiger, Mountain View, CA (US); Shantanu Rane, Menlo Park, CA (US); Alejandro E. Brito, Mountain View, CA (US); Ersin Uzun, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 412 days.

(21) Appl. No.: 15/231,689

(22) Filed: Aug. 8, 2016

(65) Prior Publication Data
US 2016/0352693 A1 Dec. 1, 2016

Related U.S. Application Data

(63) Continuation of application No. 14/479,242, filed on Sep. 5, 2014, now Pat. No. 9,413,760.

(51) Int. Cl.
*G06F 17/30* (2006.01)
*G06F 21/62* (2013.01)
*H04L 29/06* (2006.01)

(52) U.S. Cl.
CPC ...... *H04L 63/0428* (2013.01); *H04L 63/0407* (2013.01); *H04L 63/0853* (2013.01); *H04L 63/0876* (2013.01); *H04L 67/42* (2013.01)

(58) Field of Classification Search
CPC .......... G06F 17/30; G06F 21/60; G06F 21/62; G06F 21/6254; G06F 19/322
See application file for complete search history.

(56) References Cited

U.S. PATENT DOCUMENTS

| | | | |
|---|---|---|---|
| 2001/0024517 A1* | 9/2001 | Labelle | G06F 16/5838 382/170 |
| 2007/0233711 A1* | 10/2007 | Aggarwal | G06F 17/30539 |
| 2013/0031061 A1* | 1/2013 | Jagota | G06Q 10/10 707/690 |
| 2013/0226879 A1* | 8/2013 | Talukder | G06F 17/30286 707/690 |

(Continued)

*Primary Examiner* — Joseph P Hirl
*Assistant Examiner* — Kalish K Bell
(74) *Attorney, Agent, or Firm* — Krista A. Wittman

(57) ABSTRACT

A computer-implemented system and method for analyzing data quality is provided. Attributes each associated with one or more elements are maintained. A request from a user is received for determining data quality of at least one attribute based on an interest vector having a listing of the elements of that attribute and a selection of elements of interest. Each element is encrypted. A condensed vector having the same listing of elements as the interest vector is populated with occurrence frequencies for each of the listed elements. The elements of the condensed vector are encrypted by computing an encrypted product of each element in the condensed vector and the corresponding element of the interest vector. An aggregate is determined based on the encrypted products of each element of the interest vector and the corresponding element of the condensed vector. The aggregate is provided as results of the data quality.

18 Claims, 13 Drawing Sheets

(56) References Cited

U.S. PATENT DOCUMENTS

| | | | |
|---|---|---|---|
| 2014/0189858 A1* | 7/2014 | Chen | G06F 17/30289 726/22 |
| 2015/0149208 A1* | 5/2015 | Lynch | G06F 21/6254 705/3 |

* cited by examiner

| FIRST NAME | LAST NAME | AGE | STATE | ZIP CODE |
|---|---|---|---|---|
| JOHN | SMITH | 32 | CA | 94043 |
| RACHEL | SAWYER | 27 | VA | 01000 |
| PHIL | CLARK | -15 | AZ | 85011 |
| SARAH | JONES | NULL | OR | 97302 |
| TOM | ROBINS | 32 | ID | 93843 |

| AGE (71) | HASH (72) | COUNT (73) |
|---|---|---|
| 32 | 4 | 2 |
| 27 | 1 | 1 |
| -15 | 2 | 1 |
| NULL | 3 | 1 |
| 32 | - | - |

| INTEREST (81) | HASH (82) | (83) |
|---|---|---|
| NULL | 3 | 0 0 1 0 |
|  |  | 1 2 3 4 |

COMPUTER-IMPLEMENTED SYSTEM AND METHOD FOR ANALYZING DATA QUALITY

CROSS-REFERENCE TO RELATED APPLICATION

This patent application is a continuation of U.S. Pat. No. 9,413,760, issued Aug. 9, 2016, the disclosure of which is incorporated by reference.

FIELD

This application relates in general to determining a quality of data and, in particular, to a system and method for analyzing data quality.

BACKGROUND

The increase in computer use has resulted in an increase of available data. Companies are currently taking advantage of opportunities to monetize their data by selling or sharing their data with third parties, such as advertisers, and participating in collaborative data sharing initiatives, such as collaborative security. Transfer or sharing of the data can provide benefits to the data holder and well as the data recipient. For example, data holders, such as a social network, may provide their data to the data recipient in exchange for a monetary value, and the data recipient can utilize the data for providing a new service, starting a new company, or conducting research, among other opportunities.

However, data often includes inconsistencies, conflicts, and errors, which can increase data processing costs and have a negative impact on data analytics. Thus, data recipients may end up spending more time and money than expected to clean data acquired from another party prior to use. Determining the quality of a dataset prior to obtaining the data can help a business to make an informed determination regarding whether or not to acquire the dataset.

Conventional means to determine data quality and automatically clean the data exist. In one approach, audits are used to assess a quality of data held by a third party. During an audit, an individual or organization obtains full access to the data and directly examines the quality of the data. Another approach includes sharing data snippets that reflect the quality of the overall dataset to which the data snippets belong. However, both approaches breach privacy of the data. Further, a different approach includes authorizing potential clients to request computation of certain data quality metric, but the data quality metric is not kept private and allows the data holder to obtain information regarding a potential recipient of the data.

A further approach, known as the Private Set Intersection (PSI), attempts to conduct a privacy-preserving data quality assessment. PSI allows two parties to compute the intersection of their data while protecting privacy of the data for each party. Also, Private Set Intersection Cardinality (PSI-CA) reveals to each party the cardinality of the data set intersection. However, both the PSI approaches have extremely high overhead and are not practical for computing multiple data quality metrics.

Therefore, there is a need for efficiently determining the quality of a data set without disclosing the actual data to a potential recipient. Preferably, the data quality metric is provided as a private data element that cannot be seen by third parties.

SUMMARY

A potential recipient of a dataset can determine a quality of the data prior to making a final decision regarding acquisition of the data. The dataset can include attributes that are each associated with one or more elements. The potential recipient can test the data by selecting one or more data quality metrics, such as completeness of the data, validity of the data, uniqueness of the data, consistency of the data, and timeliness of the data. The potential recipient also selects elements of interest for at least one of the attributes. An interest vector that identifies the elements of interest is generated, as well as a condensed data vector that is based on elements from the dataset. The vectors can be generated based on the selected data quality metrics. An encrypted, element-by-element, product of the two vectors is determined and used to determine an encrypted aggregate of the elements of interest. Subsequently, the encrypted aggregate is used to determine a value for the selected quality metric. Based on the data quality value, the potential client can determine whether or not to acquire the dataset.

A further embodiment provides a computer-implemented system and method for analyzing data quality. Attributes each associated with one or more elements are maintained. A request from a user is received for determining data quality of at least one attribute based on an interest vector having a listing of the elements of that attribute and a selection of elements of interest. Each element is encrypted. A condensed vector having the same listing of elements as the interest vector is populated with occurrence frequencies for each of the listed elements. The elements of the condensed vector are encrypted by computing an encrypted product of each element in the condensed vector and the corresponding element of the interest vector. An aggregate is determined based on the encrypted products of each element of the interest vector and the corresponding element of the condensed vector. The aggregate is provided as results of the data quality.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 is a block diagram showing, by way of example, a sample dataset.

FIG. 6 is a flow diagram showing, by way of example, a process for generating a vector for a dataset based on a counting hashmap.

FIG. 7 is a flow diagram showing, by way of example, a process for generating an interest vector based on a hashmap.

DETAILED DESCRIPTION

The frequency of data collaboration has increased due to data commercialization. Companies can sell or transfer their data to other companies, which can use the data for research, advertising, or generating new products and services. Unfortunately, datasets often contain inconsistencies and errors, which can be time consuming and costly for a recipient of the dataset to fix. Means to determine a quality of the data prior to acquisition, while maintaining privacy of the data and a data quality value can assist companies in determining whether the dataset should be acquired without viewing the actual data.

Figure 1:
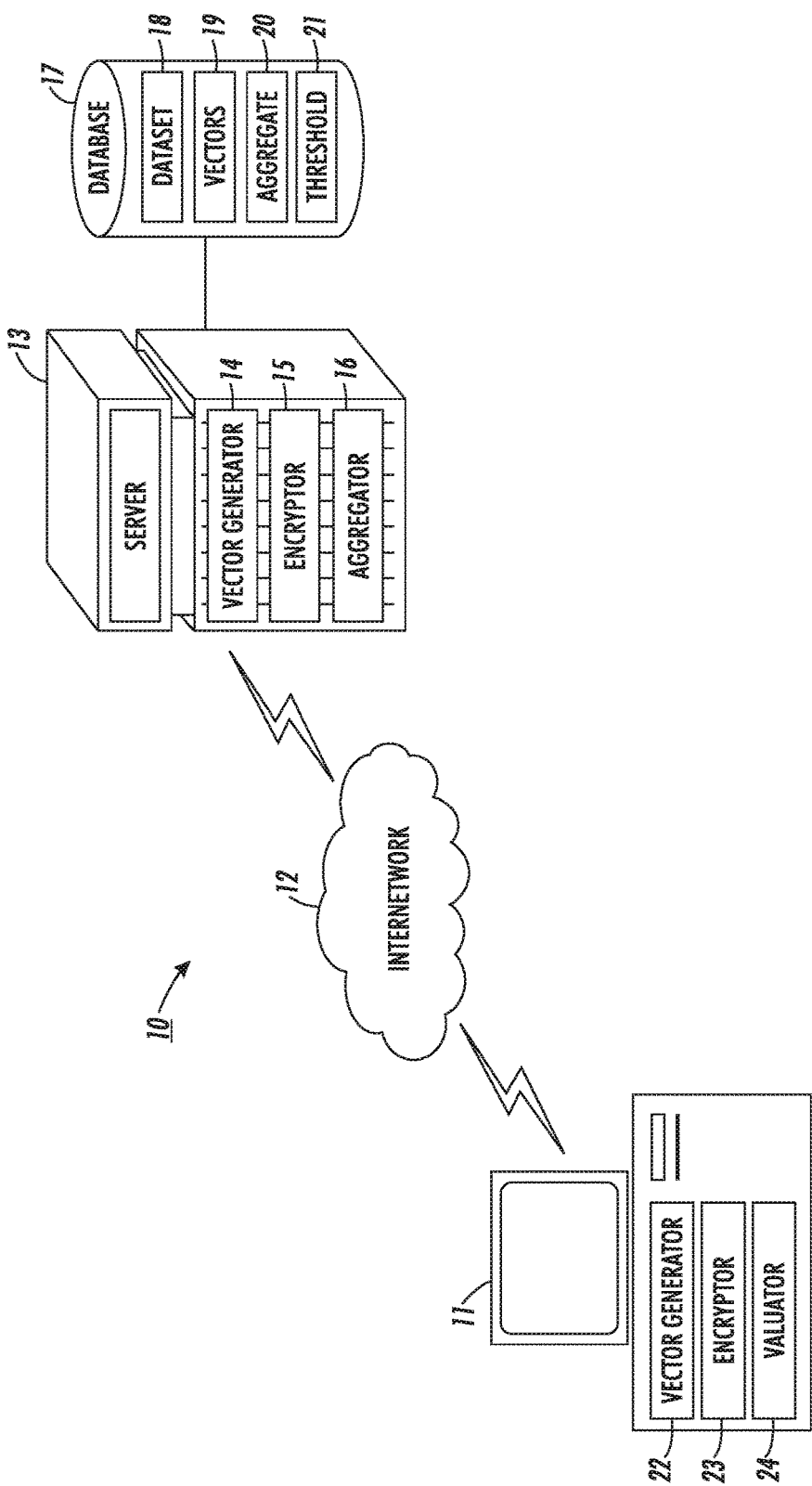
FIG. 1 is a block diagram showing a system for data quality analysis between untrusted parties, in accordance with one embodiment.

A privacy preserving data quality analysis includes representing the dataset and elements of interest in the dataset as vectors. The vectors are generated in a manner that reduces a dimensionality of the dataset, making the data quality analysis more efficient. FIG. 1 is a block diagram showing a system 10 for data quality analysis between untrusted parties, in accordance with one embodiment. The untrusted parties can include a client 11 and a server 13, which are interconnected via an internetwork 12, including the Internet. The client 11 identifies a particular dataset 18, stored in a database 17 interconnected to the server 13, for which a quality assessment can be performed. Specifically, the client 11 identifies at least one attribute of the dataset on which the quality assessment can be performed. The server 13 transmits to the client 11, a total number of unique elements for the selected attribute. A vector generator 22 on the client 11 generates an interest vector having a length equal to the number of unique elements. Those elements that are of interest to the client are identified and appropriately indicated along the interest vector, such as by a value of one. The remaining unique elements that are not of interest can be identified by a zero along the vector. Generating the interest vector is further described below with reference to FIGS. 7, 10, and 14. The client encrypts each value of the interest vector and transmits the encrypted values to the server via an encryptor 23.

Prior to, concurrently with, or subsequent to generating the interest vector, the server can generate a condensed data vector via a vector generator 14. A length of the condensed data vector is the same as the interest vector and the values along the vector can represent an occurrence frequency of each element in the dataset for the selected attribute. The server then utilizes the encrypted values of the interest vector to calculate an encrypted product of each element along the condensed data vector and a corresponding value on the interest vector via an encryptor 15. Subsequently, an aggregator 16 of the server utilizes the encrypted product to calculate an encrypted aggregate of the elements of interest. The server transmits the encrypted aggregate to the client, and a valuator 24 of the client 11 calculates a value that represents a quality of the dataset based on the encrypted aggregate. A threshold can be applied to the quality value to help the client decide whether the dataset should be acquired.

The client and server can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
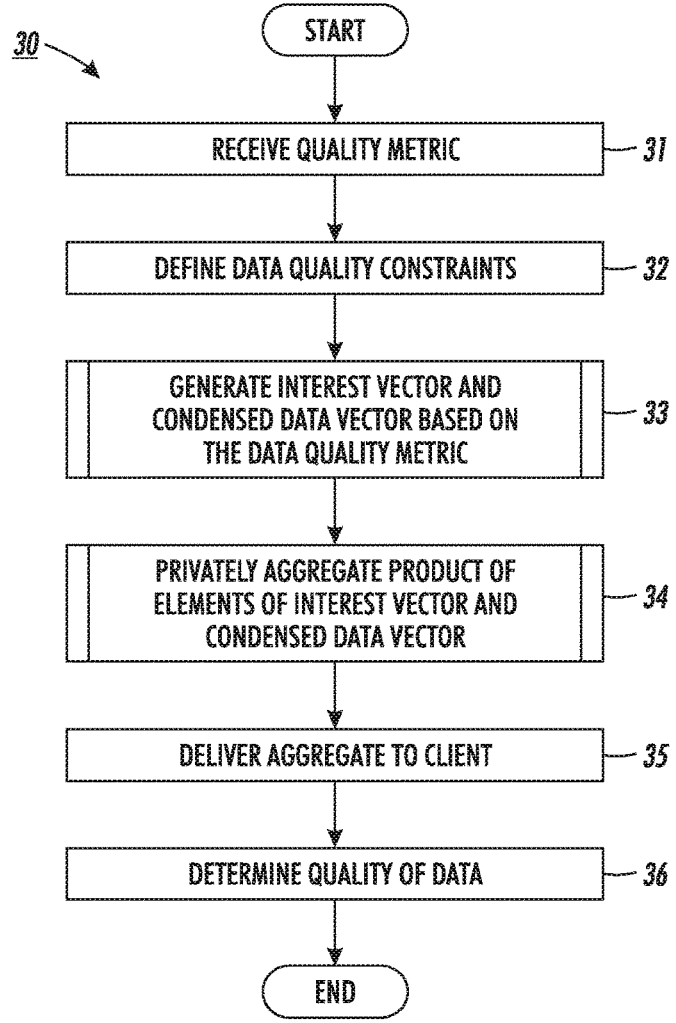
FIG. 2 is a flow diagram showing a method for data quality analysis between untrusted parties, in accordance with one embodiment.

Conducting the data quality assessment for a dataset provides a potential recipient with useful information prior to acquisition of the data, which can save the potential recipient time and money. FIG. 2 is a flow diagram showing a method 30 for data quality assessment between untrusted parties, in accordance with one embodiment. A client, or potential recipient that wishes to acquire a dataset stored on a server can apply the data quality assessment to determine whether the dataset is worth acquiring. The client provides (block 31) a quality metric for performing the data quality assessment. The quality metric can include a particular test for determining data quality, such as testing for data completeness, data validity, data uniqueness, data consistency, and data timeliness, among other metrics.

Subsequently, the client selects (block 32) a data quality constraint. Data quality is determined by testing constraints, including integrity and dependency constraints. Testing integrity constraints includes defining a variety of constraints on any given attribute of the dataset with associated parameters. A determination is then made as to whether the data elements of the attribute under consideration satisfy each constraint. Examples of integrity constraints include equality constraints, which test whether a data element matches a singleton parameter value; comparison constraints, which test whether a data element satisfies a specified comparison; subset constraints, which test whether a data element is part of a set of parameter values; interval constraints, which test whether a data element falls within a predetermined interval; and conjunction of two or more of the constraints, which test whether a data element complies with each of the two or more constraints. Testing dependency constraints includes defining a variety of relations between attributes and then testing whether the data satisfies those dependencies. For example, "zip code <--> state" is a dependency constraint that verifies whether zip codes are consistent with the associated state.

The selection of constraints to be verified depends on the data quality metrics under consideration. For example, data completeness can define a percentage of tuples in the dataset that are properly populated and can be tested using integrity constraints that check for a presence and frequency of occurrence of values that represent an incomplete value, such as NULL or " ", as well as other symbols that suggest unpopulated data elements of the attributes. Validity can identify a percentage of tuples in the dataset whose attributes possess reasonable values and can be tested using a comparison constraint or an interval constraint. Uniqueness constraints can identify a number of unique values taken by an attribute or a combination of attributes in a dataset. Consistency constraints can identify a measure of the degree to which two or more data attributes satisfy a well-defined dependency constraint. The measure of consistency can be reported as a percentage of tuples that satisfy the dependency constraint. Timeliness constraints provide a percentage of tuples having time attributes that are within a specified time frame. Use of the timeliness constraints can be substituted with the validity constraint to determine whether attributes occur within the specified time frame.

Once the quality metric and constraints have been determined, each of the client and server generate (block 33) vectors. The server generates a condensed data vector representing the data elements for each attribute selected in the dataset. Meanwhile, the client generates an interest vector that identifies those data elements of interest. Generating the vectors is further discussed below with reference to FIGS. 4, 8, and 11. The server then utilizes the vectors to determine (block 34) an aggregate of the elements of interest, which is transmitted (block 35) to the client for determining (block 36) a value for the quality of data based on the aggregate. Calculating the aggregate and the quality of data value is discussed below with reference to FIG. 19.

Figure 3:
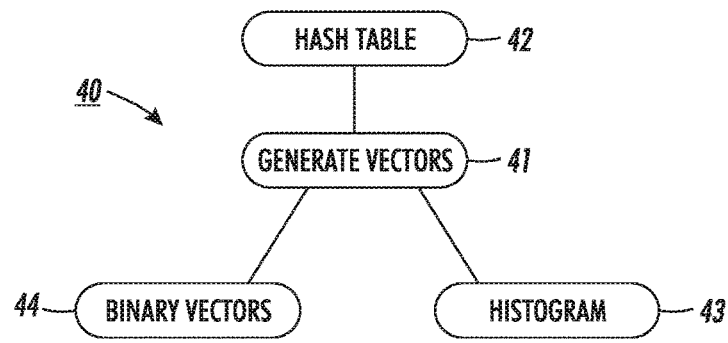
FIG. 3 is a flow diagram showing, by way of example, processes for determining vectors.

The vectors used to determine the aggregate can be generated differently based on the quality metric selected by the client for testing the dataset. FIG. 3 is a flow diagram showing, by way of example, methods 41 for generating vectors. The vectors can be generated based on a hashmap or a counting hashmap, a histogram, or as a binary vector. When determining a quality of data value based on completeness of the data, the client interest vector can be generated from a hashmap, while the server condensed data vector can be generated from a counting hashmap, as further described below with reference to FIG. 4. When a validity quality metric is selected, the client interest vector can be generated as a binary vector and the server condensed data vector can be generated from a histogram, as described below with reference to FIG. 8. The client interest vector and the server condensed data vector for a consistency quality metric determination can be generated as binary vectors as described below with reference to FIG. 11. Other methods for generating the vectors are possible.

Figure 4:
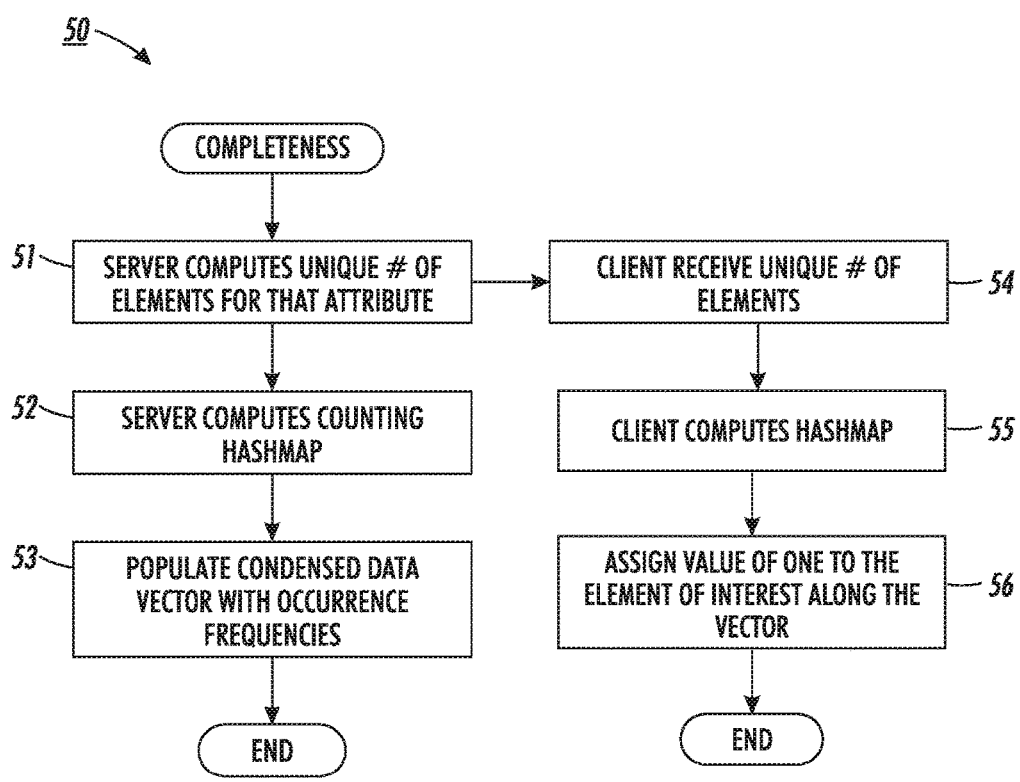
FIG. 4 is a flow diagram showing, by way of example, a process for generating vectors for data quality analysis based on completeness of a dataset.

The completeness data quality metric allows the client to assess a completeness of the dataset. FIG. 4 is a flow diagram showing, by way of example, a process for generating vectors for data quality analysis based on completeness of a dataset. Specifically, the server generates a condensed data vector, while the client generates an interest vector. The server computes (block 51) a unique number of elements t for each attribute in the dataset and transmits (block 54) the value of t to the client. The unique number of elements t is set as the vector length for the client and the server. The server then generates the condensed data vector by generating (block 52) a counting hashmap. Specifically, for each attribute, each row in the dataset associated with that attribute is reviewed and hashed to generate a hash value. The hash values can range from one to t, which means that the length of the counting hash table should be at least t. If the hash value u occurs a first time, a count of one is assigned to the element of the counting hash table indexed by u. However, if a hash value occurs more than once, then the current count value is increased by one. After the elements in each row have been hashed, the hash values are then ordered to identify a location along the vector at which the occurrence frequency for that hash value is placed (block 53). In one embodiment, the order of the hash values ranges from one to t; however, other orders are possible, such as reverse order from t to one.

Meanwhile, the client generates an interest vector representing those elements of the attribute that are of interest by generating a hashmap. Specifically, the client maps each undesirable value for completeness, or elements of interest, on to a hash map. The undesirable values that can affect a completeness of the data includes symbols that suggest that the attribute includes unpopulated elements, such as "NULL" or " ". The undesirable values selected by the client are assigned a hash value from one to t. The hashmap and the counting hash map use the same hashing functions so that each assigned hash value identifies a location along the interest vector that corresponds to the condensed data vector for that hash value. Once identified, a value of one is placed (block 56) along the vector at the corresponding location for the undesirable items of interest, while a zero is assigned to the remaining elements, which are not of interest. The interest vector and the condensed data vector are then securely multiplied to determine an aggregate measure of elements of interest, such as the number or percentage of undesirable items.

One example of generating vectors for a completeness analysis of the dataset includes determining a number of undesirable items for an age attribute. FIG. 5 is a block diagram showing, by way of example, a sample dataset 60. The dataset 60 includes attributes 61, which are listed by column along an x-axis and the rows include elements 62 under each attribute. In this dataset 60, the attributes include first name, last name, age, state, and zip code, while the elements are data values consistent with the attributes. For example, the elements for the age attribute include 32, 27, −15, Null, and 32. A client interested in acquiring the dataset wishes to determine a completeness of the dataset prior to acquisition by identifying how often the element "NULL" is used in the age column. In the attribute column, the server identifies four unique age elements and provides the number of unique elements to the client, which in this example, is t=4.

Subsequently, the server generates the condensed data vector, which represents an occurrence count of each unique element in the dataset for the age attribute. FIG. 6 is a flow diagram showing, by way of example, a process 70 for generating a condensed data vector for a dataset based on a counting hashmap. The age column 71 includes each of the elements in the dataset for the age attribute. A counting hashmap is generated to determine the condensed data vector by determining a hash value 72 for each element row by row and determining a frequency count 73 of each hash value. The hash values 72 range from one to t, which, in this example, equals four. Thus, age 32 is assigned a hash value of four and a count of one. Age 27 is assigned a hash value of one and a count of one; age −15 is assigned a hash value of two and a count of one; and Null is assigned a hash value of three and a count of one. Age 32 is assigned a hash value of 4 and since age 32 has already been hashed, the count is increased by one for a total of two occurrences. Next, the hash values are ordered along the condensed data vector 74 from one to four and the frequency of occurrence for each hash value is placed along the vector.

Prior to, concurrently, or subsequent to, the client generates the interest vector. FIG. 7 is a flow diagram showing, by way of example, a process for generating an interest vector based on a hashmap for elements of interest. As described above, the client is interested in determining a completeness of the dataset based on a value of "NULL" in the age column. Thus, "NULL" is identified as an element of interest 81. Other elements of interest are possible. The element or elements of interest are separately hashed by assigning a hash value 82. In this example, the element "NULL" is assigned a hash value of three since the same hashing algorithm is used for the hashmap and the counting hashmap. The length of the interest vector 83 equals four and is ordered from one to four. For each hash value that represents an element of interest, a one is placed along the vector 83 at the location of the corresponding hash value. In this example, a one is placed at the third location from the left of the interest vector. The remaining locations along the interest vector are populated with a zero.

The client can test each attribute in the dataset using the completeness metric or alternatively, the client can select one or more attributes for testing. In one example, an order of multiple attributes can be selected and if the quality of the first x number of attributes is high, the remaining selected attributes need not be tested. For instance, the client can select in order the age, first name, and zip code attributes. If the age and first name attributes are determined to have a high enough quality, the zip code attribute can be skipped.

Figure 8:
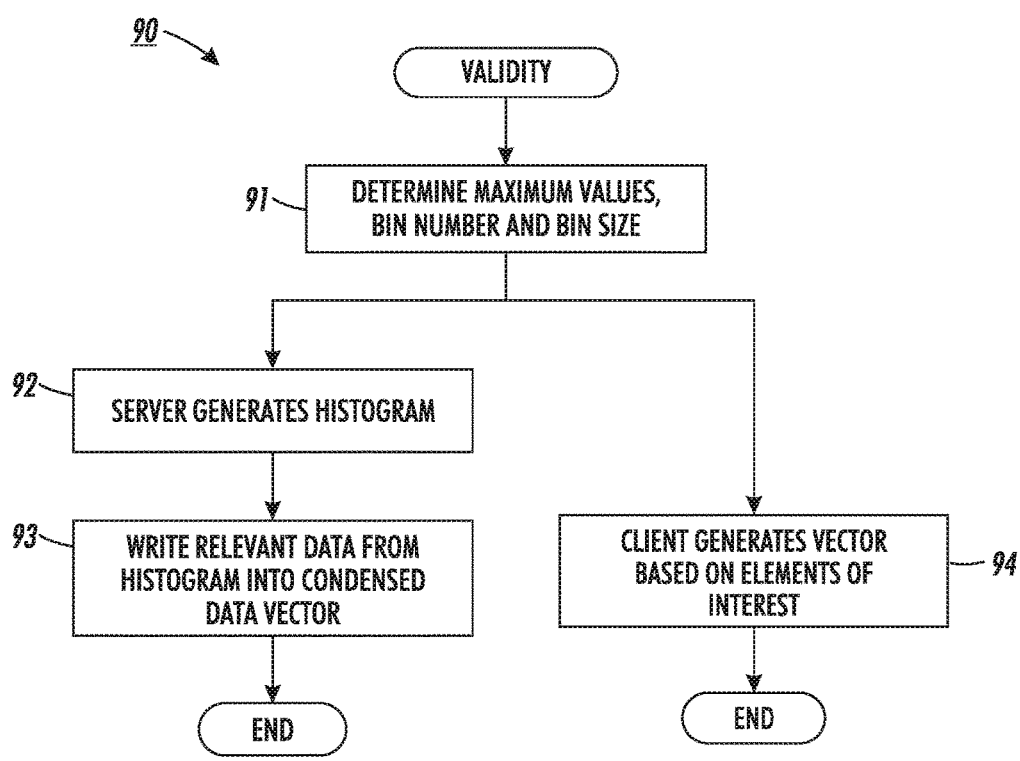
FIG. 8 is a flow diagram showing, by way of example, a process for generating vectors for data quality analysis based on validity of a dataset.

In addition to or in lieu of the completeness metric, the client can test a quality of the dataset based on a validity of the data, which determines a value of the data in the set that is valid. FIG. 8 is a flow diagram showing, by way of example, a process for generating vectors for data quality analysis based on validity of a dataset. The condensed data vector for use with the validity test can be generated using a histogram representation of the dataset. Together, the server and client agree (block 91) on a reasonable range of values, a bin size and bin number for each of the attributes in the dataset.

Next, the server transforms (block 92) the data for at least one of the attributes into a histogram with the agreed upon bin size, a number of bins, and maximum and minimum range values. The elements for the attribute are placed along an x-axis of the histogram, while a y-axis represents a frequency of occurrence of the elements in each bin. Data from the histogram is then placed (block 93) along the condensed data vector having a length that equals the total number of bins. Specifically, the bins are numbered from lowest to highest to identify locations for placing the frequencies of occurrence along the vector for each bin. Other orders are possible.

The client computes (block 94) a binary interest vector having a same length as the condensed data vector, for example, the same number of bins and the same order of bins. Subsequently, the client sets values of the elements of the interest vector corresponding to bins of interest to one and the remaining bins, which are not of interest to zero. The client is able to identify the bins of interest even though the data is unavailable to the client based on the agreed upon maximum and minimum range, bin size, and number of bins.

The client can test each attribute in the dataset using the validity metric or alternatively, the client can select one or more attributes for testing. In one example, an order of multiple attributes can be selected and if the quality of the first x number of attributes is high, the remaining selected attributes need not be tested. For instance, the client can select in order the age, first name, and zip code attributes. If the age and first name attributes are determined to have a high enough quality for validity, the zip code attribute can be skipped.

Figure 9:
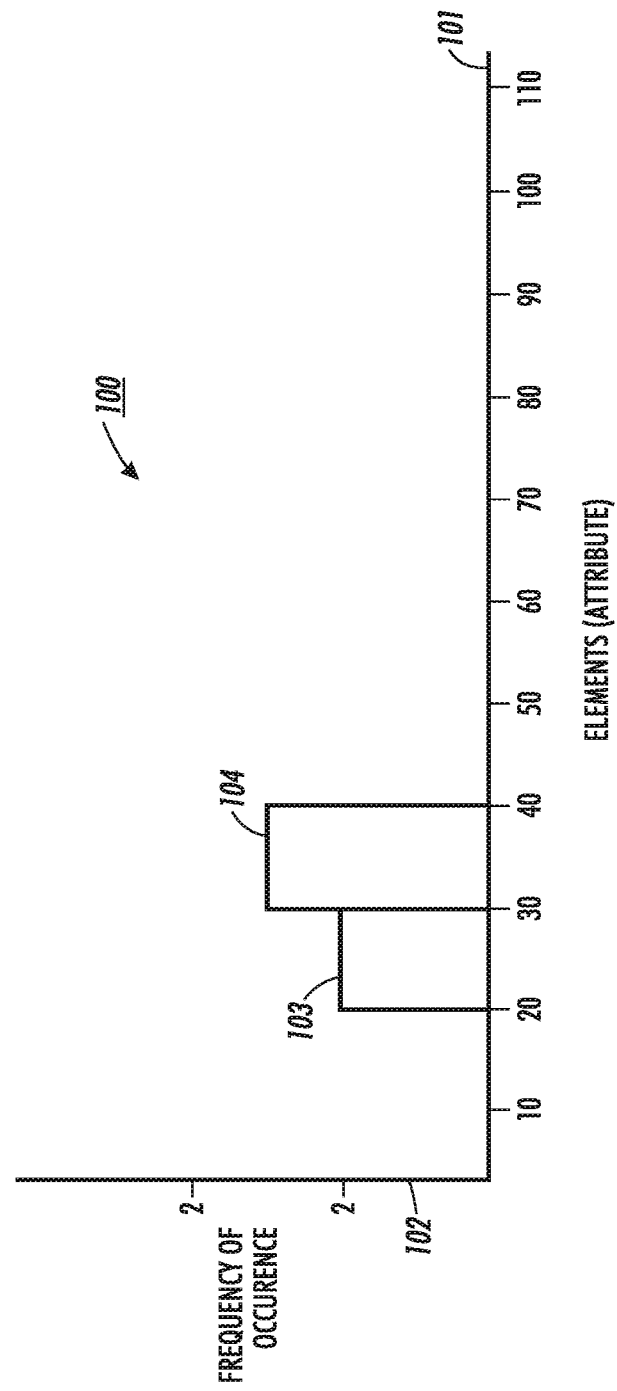
FIG. 9 is a block diagram showing, by way of example, a histogram for an attribute of the dataset.

In one example, a client wishes to test the validity of the age attribute by determining whether the data for the age attribute is valid. For example, the validity constraint test can identify a negative age, which is outside a defined interval of ages, such as [0, 110]. FIG. 9 is a block diagram showing, by way of example, a histogram 100 for an attribute of the dataset. The histogram 100 maps a frequency of age elements 101, which have a range of zero to 110, as the maximum and minimum range. The bin number of the histogram equals 11 and the bin size is 10. The age elements of the age attribute include 32, 27, −15, Null, and 32, which are mapped along the x-axis 101, while a frequency of occurrence 103, 104 of the elements in each bin are represented by the y-axis 102. The third bin with a range from 20 to 30 includes one occurrence, while the fourth bin with a range from 30-40 includes two occurrences.

Figure 10:
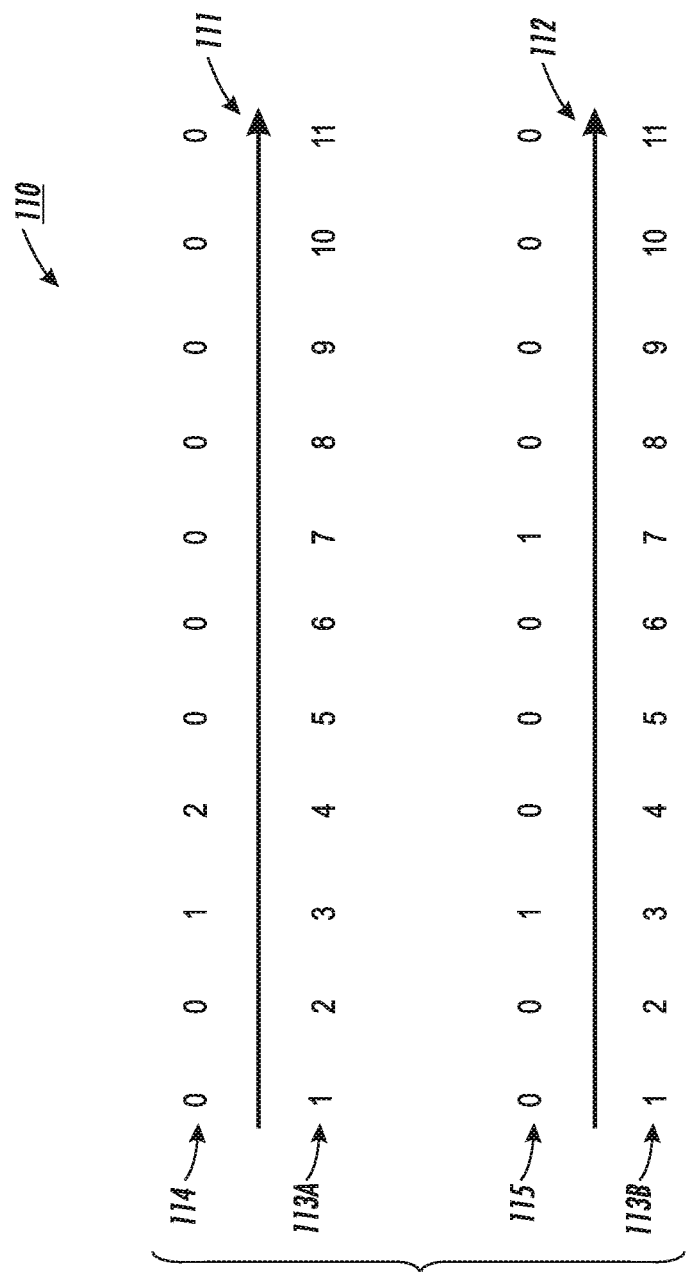
FIG. 10 is a block diagram showing, by way of example, a condensed data vector and an interest vector for use in validity analysis.

The condensed data vector and the interest vector are then ordered based on the bins in the histogram. FIG. 10 is a block diagram 110 showing, by way of example, a condensed data vector 111 and an interest vector 112 for use in validity testing. The length of each of the vectors is equal to the number of agreed upon bins. The bins 113a-b are ordered along the vector to place the corresponding frequencies of occurrence 114 for the condensed data vector and the corresponding elements of interest 115 for the interest vector. In one embodiment, the bins are ordered from smallest to largest; however, other orders are possible, as long as the order of the bins is the same for the condensed data vector and the interest vector.

For the condensed data vector, the frequencies of occurrence are placed along the vector in a location corresponding to the appropriate bin. As described above with reference to FIG. 9, there are 11 bins for the age elements. The bins are ordered by increasing age with bin 1 including ages zero to 10, bin 2 including ages 10 to 20, and so on. The frequencies for each bin are then placed along the vector at the appropriate location based on the corresponding bin.

The interest vector is a binary vector that includes a value of one for bins that include an element of interest selected by the client and a value of zero for the remaining bins. In this example, the client is interested in ages between 20 and 30, and 60 to 70, as indicated by the presence of the value one in the corresponding bins. Once generated, the vectors are then used to determine an aggregate of the elements of interest, as further described below with reference to FIG. 19.

In a further embodiment, a number of values that fall outside the minimum/maximum range for a given attribute, such as negative age values, can be determined. The client assigns all ones to the interest vector and after determining the aggregate, the client subtracts a number of tuples from the aggregate to compute the number of elements absent from the histogram.

Figure 11:
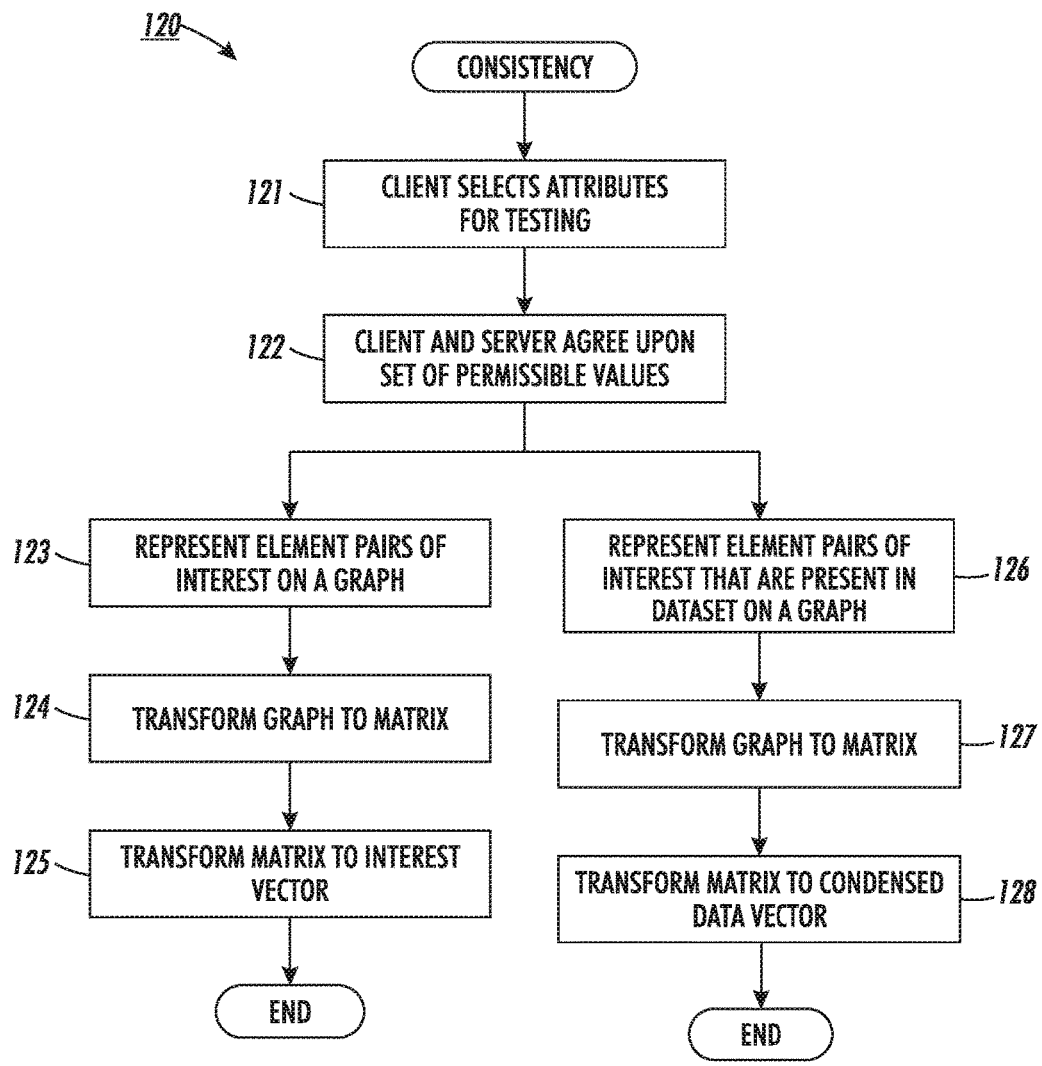
FIG. 11 is a flow diagram showing, by way of example, a process for generating vectors for data quality analysis based on consistency of a dataset.

When testing for data consistency, the vectors can be determined using a dependency constraint. FIG. 11 is a flow diagram showing, by way of example, a process 120 for generating vectors for testing a consistency of a dataset. The client determines (block 121) an association rule that involves at least two attributes $A_j$ and $A_k$ and can be expressed as a binary valued mapping $f(a_j, a_k)$. The client and server agree (block 122) on a finite set of permissible values for $A_j$ and $A_k$. For instance, the Cartesian product for sets of permissible values includes $|A_j| \cdot |A_k|$ pairs of the form $(a_j, a_k)$. For example, if $A_j$ represents states in the United States, the value can be set to five states, while $A_k$ represents 1000 zip codes as a total number of attributes, then $|A_j| \cdot |A_k|=5000$. The values for each of $A_j$ and $A_k$ higher than the number of states or zip codes, respectively, represented in the dataset. Further, each $(a_j, a_k)$ pair represents a corresponding element pair for the attributes $A_j$ and $A_k$.

The dependency between the two (in general m attributes) attributes is then observed and mapped (block 123) on a two dimensional (in general m-dimensional) graph. For example, the state names and zip code attributes are selected from the dataset of FIG. 3. In one example, the zip codes are listed along an x-axis of the graph, while the states are listed along a y-axis of the graph. Pairs of elements for the zip code and state attributes are reviewed and a determination is made as to whether the elements are consistent with one another. For instance, the zip code, state pair of $f(94043, CA)$ is correct since the 94043 zip code is in the state of California. In contrast, the zip code, state pair of $f(01000, WA)$ is incorrect since the zip code 01000 is not in Washington state. A mapping of $f(94043, CA)$ is assigned a value of one since the element pair is correct and is placed on the graph. Meanwhile, a mapping of $f(01000, WA)$ is assigned a value of zero since the pair of elements is incorrect and the zero value is placed on the graph. The graph is transformed (block 124) to a matrix. Specifically, the matrix is generated as a two-dimensional data structure with one dimension based on the x-axis values of the two-dimensional graph and the other dimension based on the y-axis of the two-dimensional graph. However, other dimensions of the server graph and matrix are possible based on the number of attributes selected for consistency testing. Subsequently, the matrix is then transformed (block 125) to generate the interest vector. The interest vector has a length equal to $|A_j| \cdot |A_k|$ and is further described below with reference to FIG. 14.

Prior to, concurrently with, or subsequent to the generation of the interest vector, the server reads the values of the element pairs for the two attributes and computes (block 126) a binary valued mapping $g(a_j, a_k)$, or two-dimensional graph based on those element pairs that are present in the dataset. Each pair of values that exists in the dataset can be assigned a value of one in the graph. Otherwise, the element pair will be assigned a value of zero. The server graph will include the same number of one values as the number of tuples n in the dataset. Additionally, the graph will include a number of zeros equal to $|A_j| \cdot |A_k|-n$. In a further embodiment, the client can generate the interest vector directly from the values of the function $f$.

Next, the server graph is transformed (block 127) into a matrix. In one example, the matrix is a two-dimensional matrix with one dimension based on the x-axis values of the two-dimensional graph and the other dimension based on the y-axis of the two-dimensional graph. However, other dimensions of the server graph and matrix are possible based on the number of attributes selected for consistency testing. The matrix is then transformed (block 128) into a condensed data vector. Specifically, the vector is generated by placing the values of matrix along the vector, as further described below with reference to 18. The length of each vector is equal to $|A_j| \cdot |A_k|$ for the two-dimensional example considered here. In a further embodiment, the server can generate the condensed data vector directly from the values of the function $f$.

More than two attributes can be selected for consistency testing. Each selected attribute represents a dimension that is reflected by the graph and the matrix to increase dimensionality. Further, the client can select one or more groupings of attributes for testing. In one example, an order of multiple attribute pairs can be selected and if the quality of the first x number of attributes pairs is high, the remaining selected attributes need not be tested.

Figure 12:
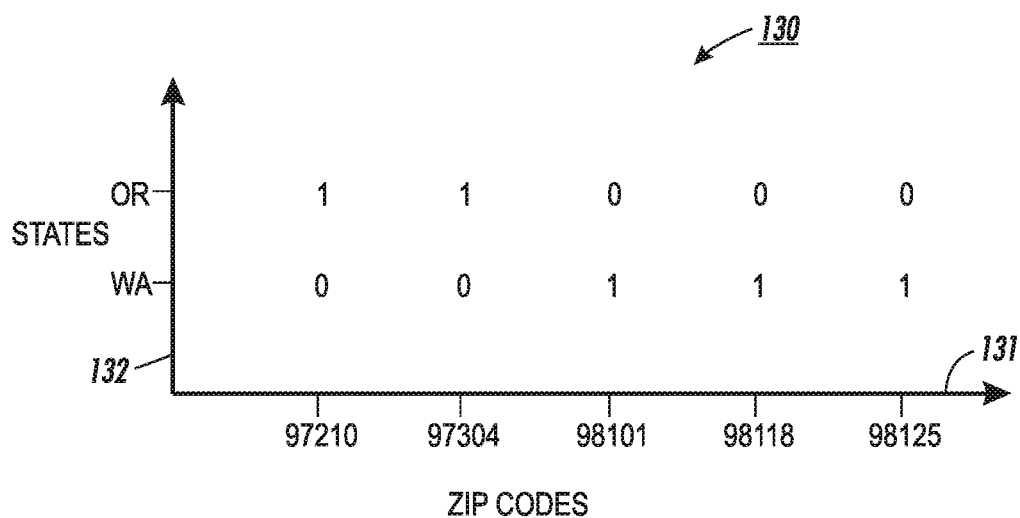
FIG. 12 is a block diagram showing, by way of example, a two-dimensional graph 130 of element dependency pairs.

In one example of generating the vectors using the consistency metric, a client generates an association rule involving the state and zip code attributes to determine a quality of data based on the consistency metric. The client is interested in the states Washington and Oregon and the zip codes 97210, 97304, 98101, 98118, and 98125. Thus, the finite set of permissible values is 10. The client generates a map based on the states and zip codes of interest. FIG. 12 is a block diagram showing, by way of example, a two-dimensional graph 130 of element dependency pairs. The x-axis 131 represents the elements of the zip code attribute, while the y-axis 132 represents elements of the state attribute. Values of one are placed in the graph for each state/zip code pair that is valid, and values of zero are placed in the graph for each state/zip code pair that is false.

Figure 13:
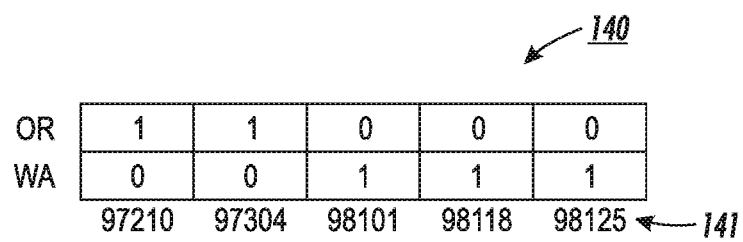
FIG. 13 is a block diagram showing, by way of example, a matrix 140 of the element dependency pairs of FIG. 12.

Once finalized, the graph is transformed into a matrix. FIG. 13 is a block diagram showing, by way of example, a matrix 140 of the element dependency pairs of FIG. 12. The matrix 140 includes five columns and two rows. The columns are representative of the zip codes 141, while the rows are representative of the states 142. The zero and one values from the graph are used to populate the matrix.

Figure 14:
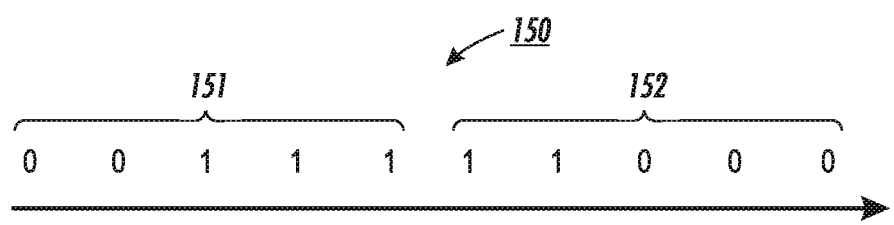
FIG. 14 is a block diagram showing, by way of example, an interest vector 150 for the element dependency pairs of FIG. 12.

The matrix is then transformed into the interest vector by placing the binary values along the vector. FIG. 14 is a block diagram showing, by way of example, an interest vector 150 for the element dependency pairs of FIG. 12. The interest vector 150 includes the zero and one values from the matrix, which are ordered along the vector. To generate the interest vector 150, the values 151 from the very bottom row are placed in order at the beginning, or left side, of the vector with a direction of the vector to the right. Then, the values 152 from the next row, which is above the previous row, are ordered along the vector after the values 151 from the previous row. The values of the rows continue to be placed until all the values are represented along the interest vector.

Figures 15, 16:
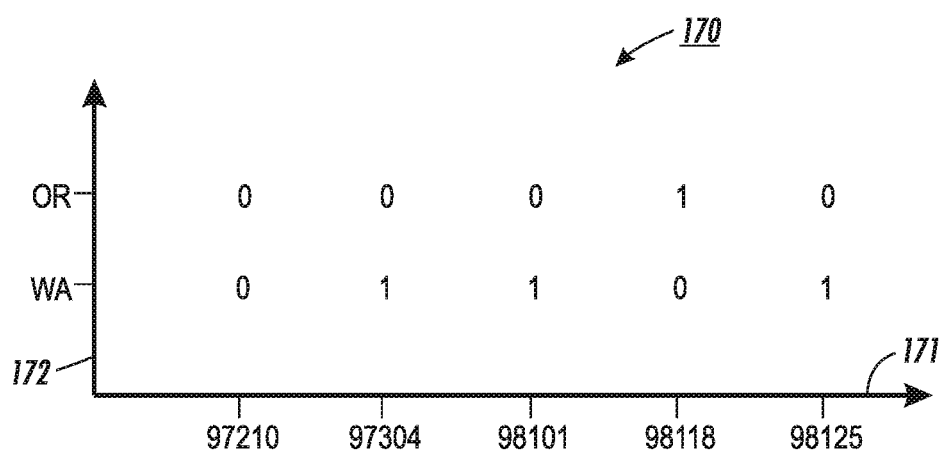
FIG. 15 is a block diagram showing, by way of example, a dataset for testing via a consistency metric.
FIG. 16 is a block diagram showing, by way of example, a two-dimensional graph 170 showing a presence or absence of each element pair of FIG. 12.

Meanwhile, the server also generates a two-dimensional graph, which identifies whether the states and zip codes of interest are located in the dataset. FIG. 15 is a block diagram showing, by way of example, a dataset for testing via a consistency metric. The dataset 160 includes attributes 161, which are listed along the columns of the graph, while the elements 162 populate the rows under each attribute.

The dataset is used to generate the graph for the condensed data vector. FIG. 16 is a block diagram showing, by way of example, a two-dimensional graph 170 showing a presence or absence of each element pair of FIG. 12. The graph 170 includes zip codes 171 along an x-axis and states 172 along a y-axis. The server populates the values of the graph by reading the values of the element pairs of the client graph and computing a binary valued mapping that assigns a value of one to the pair when that pair exists in the database and a value of zero when the pair does not exist in the database.

Figures 17, 18:
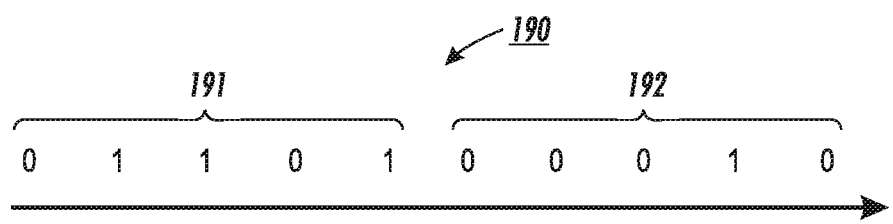
FIG. 17 is a block diagram showing, by way of example, a matrix 180 of the element dependency pairs of FIG. 12 that exist in the dataset of FIG. 15.
FIG. 18 is a block diagram showing, by way of example, a condensed data vector 190 for the element dependency pairs of FIG. 12 that exist in the dataset of FIG. 15.

Subsequently, the graph is transformed into a matrix. FIG. 17 is a block diagram showing, by way of example, a matrix 180 of the element dependency pairs of FIG. 12 that exist in the dataset of FIG. 15. The zip codes are listed along an x-axis 181 of the matrix, while the states are listed along a y-axis 182. The grids are populated with values from the graph of FIG. 17 to indicate whether each element pair is present in the dataset.

The matrix is transformed to generate the condensed data vector. FIG. 18 is a block diagram showing, by way of example, a condensed data vector 190 for the element dependency pairs of FIG. 12 that exist in the dataset of FIG. 15. The condensed data vector 190 includes the binary values from the matrix of FIG. 17, which are ordered along the vector 190. To generate the condensed data vector 190, the values 191 from the very bottom row of the matrix 190 are placed in order at the beginning, or left side, of the vector, with a direction of the vector to the right. Then, the values 192 from the next row, which is located above the previous row, are ordered along the vector after the values 191 from the previous row. The values of the rows continue to be placed until all the values are represented along the interest vector.

The element and interest vectors, whether determined using the completeness metric, validity metric, consistency metric, or another metric, can be used to determine an aggregate of elements of interest, which is forwarded to the client for calculating a quality of data value. To prevent the client from viewing the dataset during the data quality analysis and the server from viewing the elements of interest to the client, encryption is used. In one embodiment, a public key cryptosystem can be used, such as the Paillier cryptosystem. The client possesses the public/private key pair of an additively homomorphic cryptosystem, while the server only possesses the client's public key.

Figure 19:
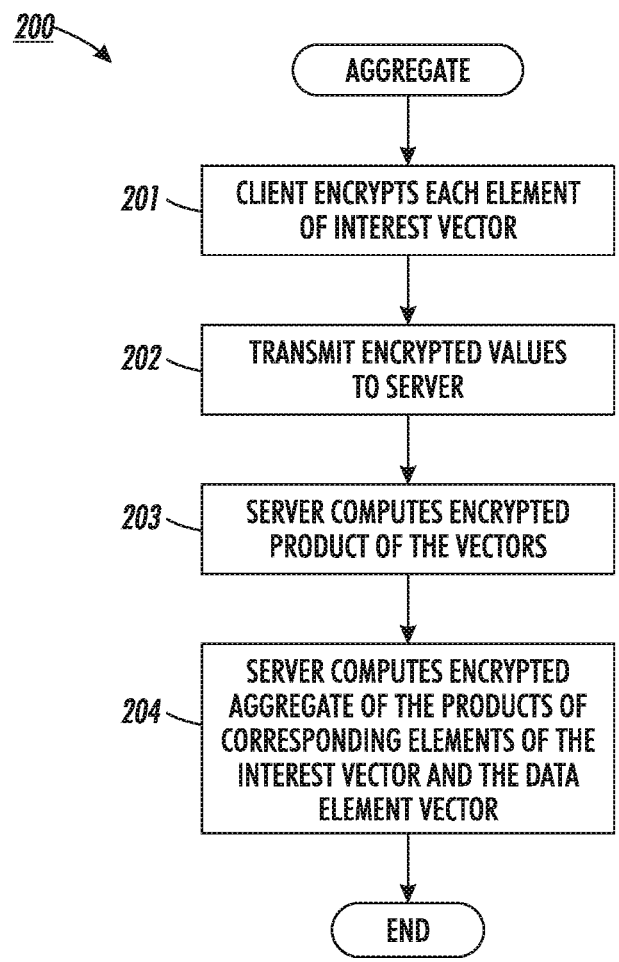
FIG. 19 is a flow diagram showing, by way of example, a process for determining an aggregate of the elements of interest.

The encryption process ensures that the aggregate is encrypted and the server is unable to view the data of the interest vector from the client by allowing the server to only operate on the encrypted vector values. FIG. 19 is a flow diagram showing, by way of example, a process 200 for determining an aggregate of the elements of interest. The client encrypts (block 201) each element in the interest vector to obtain $E(a_j)$ and transmits (block 202) each encrypted element to the server. Then, for each element in the condensed data vector, the server computes (block 203) an encrypted product $E(a_j b_j)$ of that element and the corresponding element in the interest vector, using the additively homomorphic properties of the cryptosystem, such as the Paillier cryptosystem, according to the following equation:

$$E(a_j b_j) = E(a_j)^{b_j} \quad \text{Eq. 1}$$

wherein $b_j$ represents the value for an element along the condensed data vector that corresponds to the element $a_j$ along the interest vector. Subsequently, the server uses the encrypted product of each element pair to determine (block 204) an encyrpted aggregate $E(\gamma)$ for the elements of interest. The aggregate can be calculated based on the encrypted product of the element pairs according to the following equation:

$$E(\gamma) = E(\Sigma_{j=1}^m a_j b_j) = \Pi_{j=1}^m E(a_j b_j) \quad \text{Eq. 2}$$

where m represents a common number of elements in each of the vectors. Each of the encrypted element pair products is multiplied, as shown in Eq. 2, to determine the encrypted sum of each element pair, which represents the encrypted aggregate. The encrypted aggregate is then transmitted from the server to the client for calculating the quality of data value.

Once received, the client decrypts the aggregate using a private key and calculates the quality of data value, which is dependent on the quality metric selected for testing the data. For the completeness metric, the aggregate determined for each attribute selected for testing by the client is used to determine a quality of the data according to the following equation:

$$\text{Completeness} = 1 - \frac{\Sigma_{i \in \mathcal{M}} \gamma i}{n|\mathcal{M}|} \quad \text{Eq. 3}$$

where $\mathcal{M}$ is a set of attributes the client wants to test and n represents a number of tuples in the dataset. For example, if the client wants to test the completeness of the whole dataset, then $\mathcal{M} = \{1, 2, \ldots, m\}$. m represents the number of database attributes, and nm represents the total number of elements in the database.

The quality of the dataset can also be based on a validity metric to determine a percentage of data in the dataset that is valid. The data quality using the validity metric can be calculated according to the following equation:

$$\text{Validity} = \frac{\Sigma_{i \in \mathcal{M}} \gamma i}{n|\mathcal{M}|} \quad \text{Eq. 4}$$

where $\mathcal{M}$ is a set of attributes the client wants to test and n represents a number of tuples in the dataset.

A quality of data using the consistency metric is determined using the following equation in which the determined aggregates for each attribute pair is input:

$$\text{Consistency}(\mathcal{M}) = \frac{\gamma}{n} \quad \text{Eq. 5}$$

where n represents a number of tuples in the dataset and M is a set of attributes the client wants to test. For example, $\mathcal{M} = \{A_j, A_k\}$.

Once the quality of data is determined based on one or more of the metrics, a predetermined threshold can be applied to the data quality value so the client can determine whether to acquire the data based on the data quality. When the quality satisfies the threshold, the client may be more likely to proceed with the acquisition. In contrast, when the data quality fails to satisfy the threshold, a client is likely to refuse receipt of the data to prevent undue time and cost in preparing the data for use. The threshold can be the same or different for each data quality metric.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for analyzing data quality, comprising:
   memory storing a dataset comprising attributes each associated with one or more elements;
   a client comprising an interest vector module to receive from a user a request for determining data quality of at least one attribute of the dataset based on an interest vector comprising a listing of the elements of that attribute and a selection of one or more of the elements as elements of interest, wherein the client generates the interest vector from one of a hashmap and a histogram and each element is encrypted; and
   a server, comprising:
      a condensed vector module to populate a condensed vector comprising the same listing of elements as the interest vector with occurrence frequencies for each of the listed elements;
      an encryption module to encrypt the elements of the condensed vector by computing an encrypted product of each element in the condensed vector and the corresponding element of the interest vector;
      an aggregate module to determine an aggregate based on the encrypted products of each element of the interest vector and the corresponding element of the condensed vector; and
      providing the aggregate as results of the data quality request.

2. A system according to claim 1, wherein the client generates the interest vector by assigning a value of one to each of the elements of interest and a value of zero to each of the elements not of interest.

3. A system according to claim 1, wherein the client determines a length of the interest vector by one of setting the vector length as a number of the elements associated with that attribute and setting the vector length as a number of bins into which the elements are organized.

4. A system according to claim 1, wherein the server generates the condensed vector via one of a counting hashmap and a histogram.

5. A system according to claim 4, wherein the hashmap of the interest vector and the counting hashmap of the condensed vector use the same hashing functions.

6. A system according to claim 4, wherein the server obtains the frequencies of occurrence from one of the counting hashmap and histogram.

7. A system according to claim 1, wherein the client decrypts the aggregate for the attribute and calculates a quality of data value based on the decrypted aggregate.

8. A system according to claim 7, wherein a threshold is applied to the quality of data value to provide an indication of the data quality.

9. A system according to claim 1, wherein testing of the attributes comprises at least one of testing each attribute in the dataset for the determined data quality and testing the attributes in the dataset in order until the first x number of attributes test high for the determined data quality, then the testing of the remaining attributes is skipped.

10. A computer-implemented method for analyzing data quality, comprising:
    maintaining a dataset comprising attributes each associated with one or more elements;
    receiving from a user a request for determining data quality of at least one attribute of the dataset based on an interest vector comprising a listing of the elements of that attribute and a selection of one or more of the elements as elements of interest, wherein the interest vector is generated via one of a hashmap and a histogram and each element is encrypted;
    populating a condensed vector comprising the same listing of elements as the interest vector with occurrence frequencies for each of the listed elements;
    encrypting the elements of the condensed vector by computing an encrypted product of each element in the condensed vector and the corresponding element of the interest vector;
    determining an aggregate based on the encrypted products of each element of the interest vector and the corresponding element of the condensed vector; and
    providing the aggregate as results of the data quality request.

11. A method according to claim 10, further comprising:
    generating the interest vector by assigning a value of one to each of the elements of interest and a value of zero to each of the elements not of interest.

12. A method according to claim 10, further comprising:
    determining a length of the interest vector, comprising one of:
       setting the vector length as the number of elements associated with that attribute; and
       organizing the elements into bins and setting the vector length as the number of bins.

13. A method according to claim 10, further comprising:
    generating the condensed vector via one of a counting hashmap and a histogram.

14. A method according to claim 13, wherein the hashmap of the interest vector and the counting hashmap of the condensed vector use the same hashing functions.

15. A method according to claim 13, further comprising:
    obtaining the frequencies of occurrence from one of the counting hashmap and histogram.

16. A method according to claim 10, further comprising:
    decrypting via a client the aggregate for the attribute; and
    calculating a quality of data value based on the decrypted aggregate.

17. A method according to claim 16, further comprising:
    providing an indication of the data quality by applying a threshold to the quality of data value.

18. A method according to claim 10, further comprising at least one of:
    testing each attribute in the dataset for the determined data quality; and
    ordering the attributes in the dataset for testing and when the first x number of attributes test high for the determined data quality, skipping testing of the remaining attributes.

* * * * *